(12) United States Patent
Kim et al.

(10) Patent No.: US 12,566,358 B2
(45) Date of Patent: Mar. 3, 2026

(54) SENSOR DRIVING DEVICE AND CAMERA MODULE INCLUDING SAME

(71) Applicant: LG INNOTEK CO., LTD., Seoul (KR)

(72) Inventors: Min Ook Kim, Seoul (KR); Young Seop Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/685,146

(22) PCT Filed: Aug. 16, 2022

(86) PCT No.: PCT/KR2022/012213
§ 371 (c)(1),
(2) Date: Feb. 20, 2024

(87) PCT Pub. No.: WO2023/022482
PCT Pub. Date: Feb. 23, 2023

(65) Prior Publication Data
US 2025/0044667 A1 Feb. 6, 2025

(30) Foreign Application Priority Data
Aug. 17, 2021 (KR) ........................ 10-2021-0107831

(51) Int. Cl.
*G03B 13/36* (2021.01)
*G03B 3/10* (2021.01)
(Continued)

(52) U.S. Cl.
CPC .............. *G03B 13/36* (2013.01); *G03B 3/10* (2013.01); *G03B 5/00* (2013.01); *G03B 17/12* (2013.01);
(Continued)

(58) Field of Classification Search
CPC ............ G03B 13/36; G03B 3/10; G03B 5/00; G03B 17/12; G03B 17/55; G03B 2205/0061; G03B 2205/0069
(Continued)

(56) References Cited

U.S. PATENT DOCUMENTS

| | | |
|---|---|---|
| 2005/0134699 A1 | 6/2005 | Nagashima et al. |
| 2006/0127072 A1 | 6/2006 | Seo |

(Continued)

FOREIGN PATENT DOCUMENTS

| | | |
|---|---|---|
| JP | 2006-171286 A | 6/2006 |
| JP | 4275717 B2 | 6/2009 |

(Continued)

OTHER PUBLICATIONS

Henderson et al., "Continuous Auto Focus for Next Generation Phone Cameras," Acutator, 2010, 4 pages total.

*Primary Examiner* — Joel W Fosselman
(74) *Attorney, Agent, or Firm* — Birch, Stewart, Kolasch & Birch, LLP

(57) ABSTRACT

A sensor driving device according to an embodiment includes a fixed part; a first moving part disposed inside the fixed part and spaced apart from the fixed part; a second moving part disposed inside the first moving part and spaced apart from the first moving part, and including an image sensor; a first driving part that moves the first moving part relative to the fixed part; and a second driving part that moves the second moving part relative to the first moving part, wherein the first driving part is provided to move the first moving part based on a first driving force corresponding to a first driving method, and the second driving part is provided to move the second moving part based on a second driving force of a second driving method different from the first driving method.

19 Claims, 6 Drawing Sheets

(51) Int. Cl.
    *G03B 5/00*         (2021.01)
    *G03B 17/12*       (2021.01)
    *G03B 17/55*       (2021.01)

(52) U.S. Cl.
    CPC ...... *G03B 17/55* (2013.01); *G03B 2205/0061*
              (2013.01); *G03B 2205/0069* (2013.01)

(58) Field of Classification Search
    USPC ......................................................... 348/345
    See application file for complete search history.

(56)              References Cited

U.S. PATENT DOCUMENTS

| | | | |
|---|---|---|---|
| 2007/0053672 A1 | 3/2007 | Westerweck et al. | |
| 2011/0097061 A1 | 4/2011 | Lee et al. | |
| 2012/0268642 A1* | 10/2012 | Kawai ................... | H04N 23/54 |
| | | | 359/554 |
| 2013/0250169 A1 | 9/2013 | Kim | |
| 2019/0349504 A1* | 11/2019 | Yeo ......................... | G03B 5/00 |

FOREIGN PATENT DOCUMENTS

| | | |
|---|---|---|
| KR | 10-2011-0045343 A | 5/2011 |
| KR | 10-2013-0041283 A | 4/2013 |
| KR | 10-2013-0106914 A | 10/2013 |
| KR | 10-2021-0031140 A | 3/2021 |
| KR | 10-2021-0081556 A | 7/2021 |

\* cited by examiner

【FIG. 1】
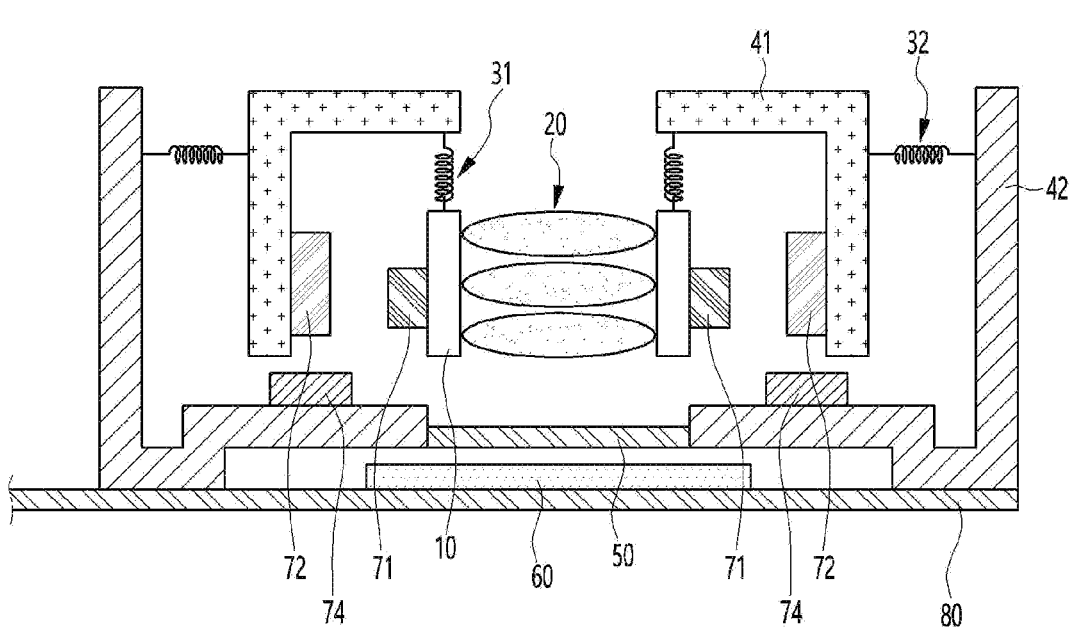

【FIG. 2】
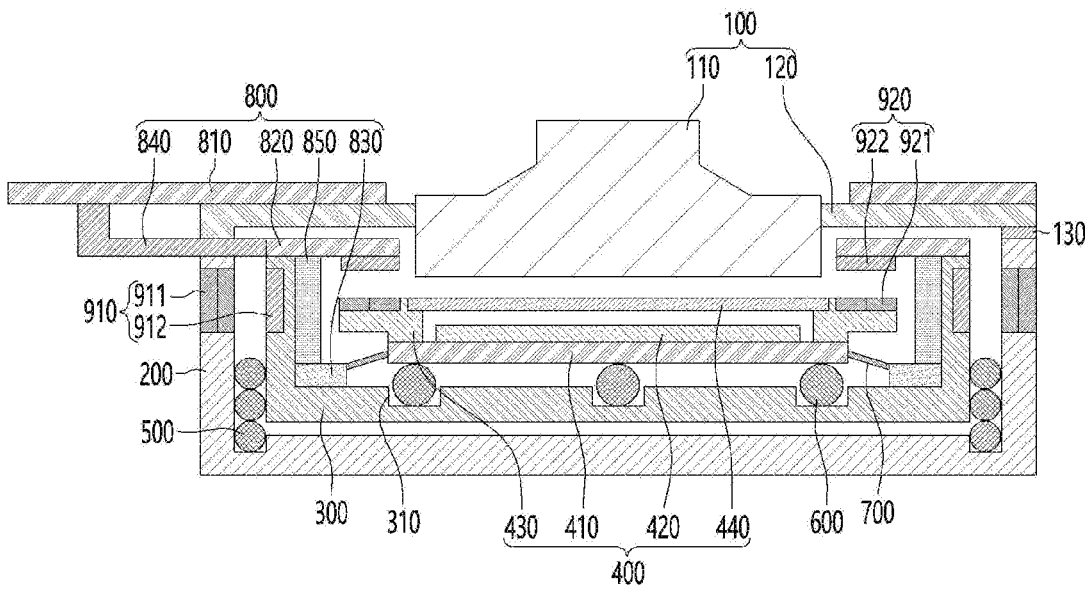
【FIG. 3】
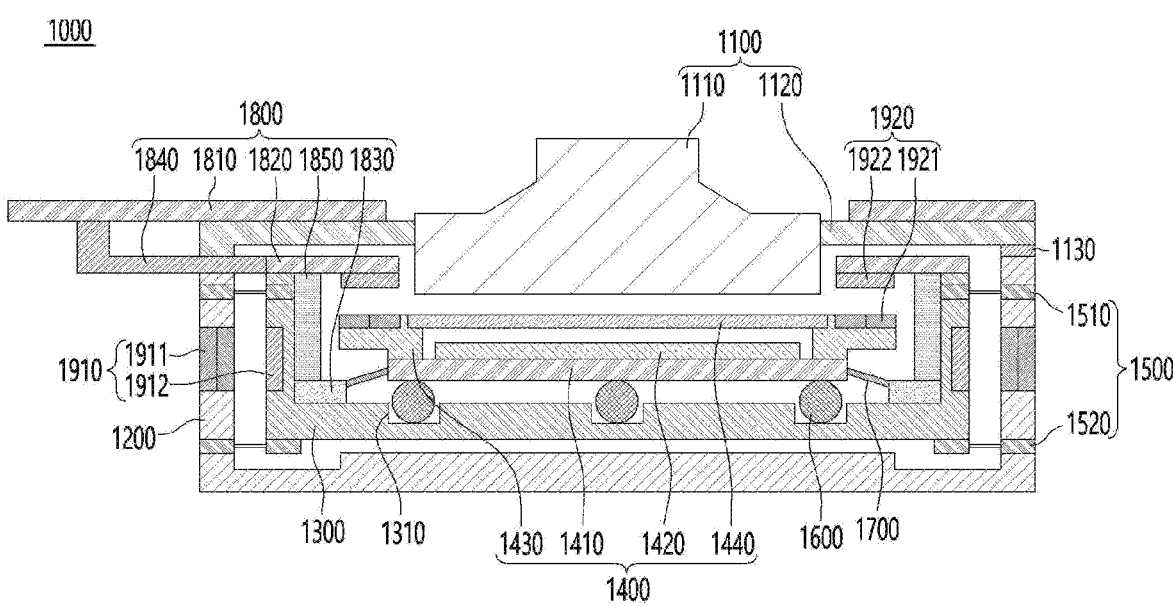

【FIG. 4】
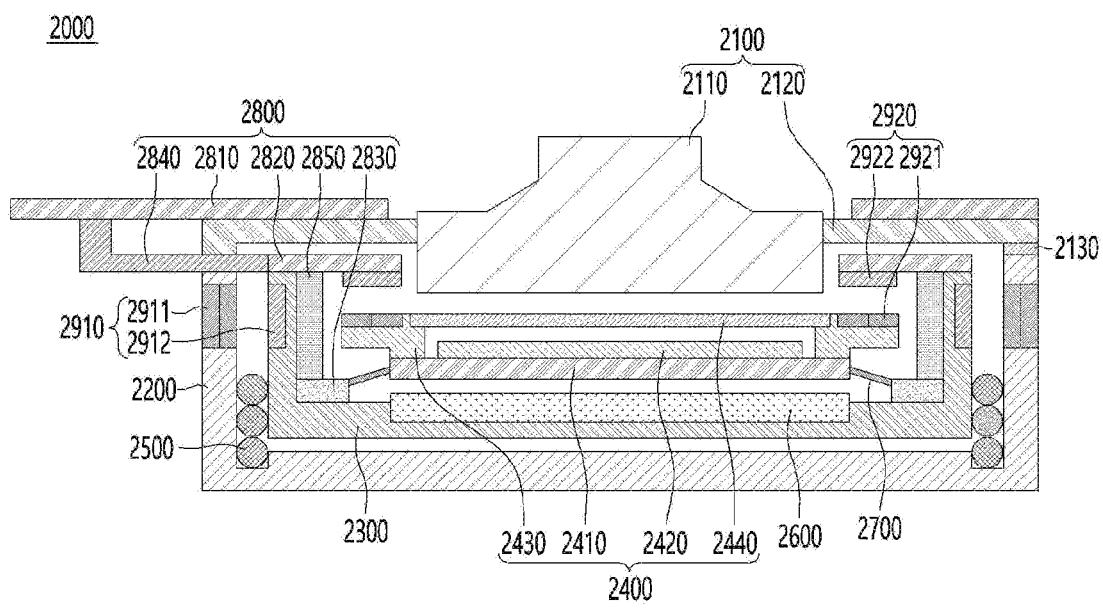
【FIG. 5】
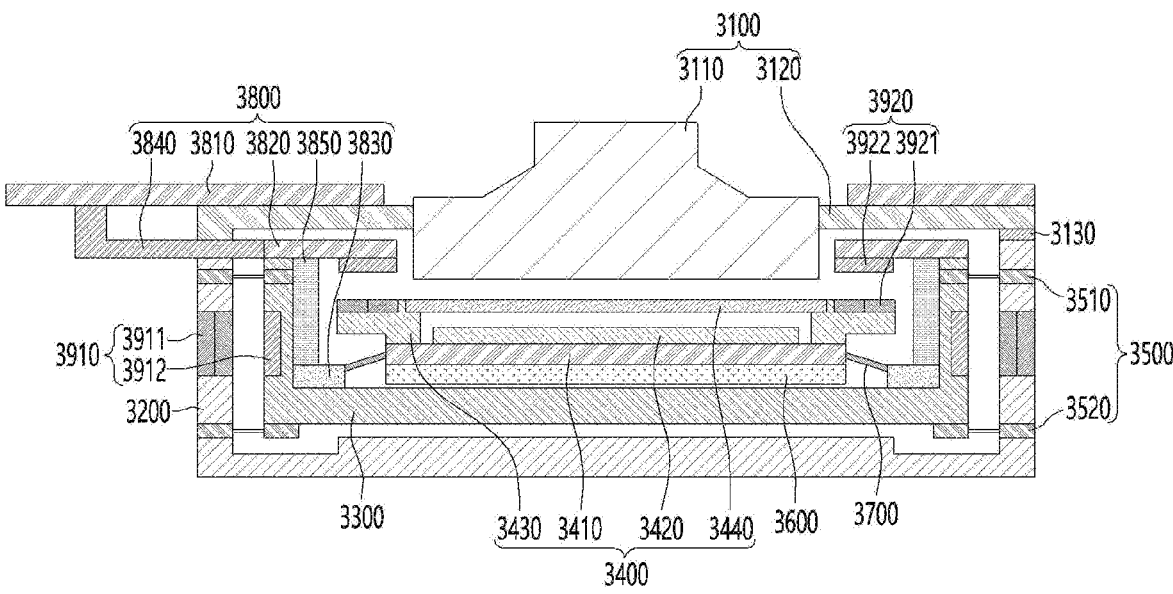

【FIG. 6】
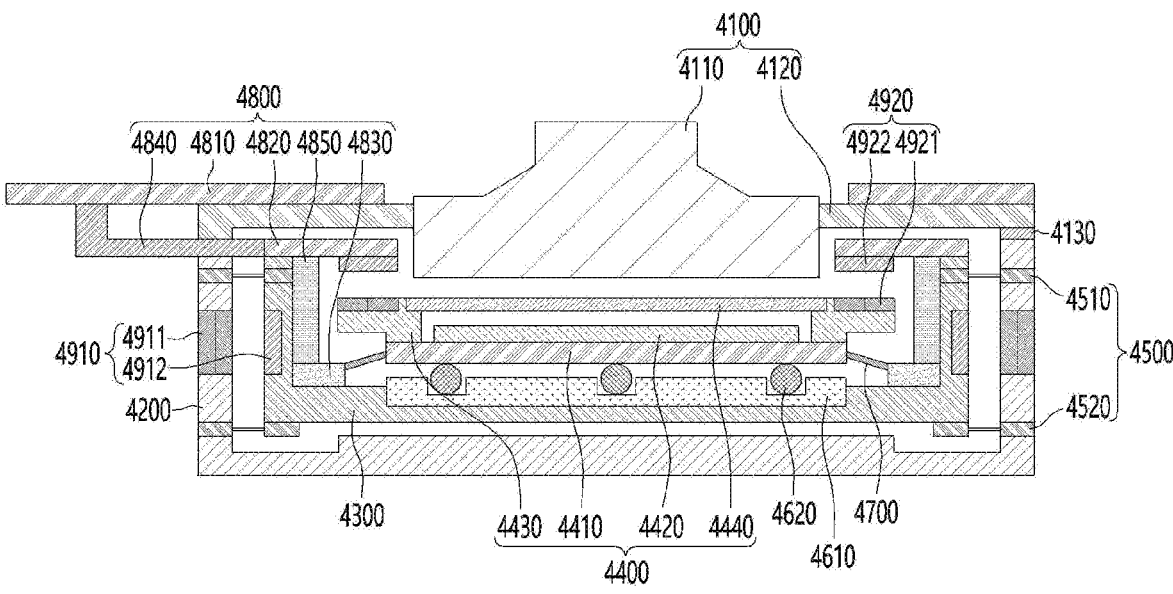
【FIG. 7】
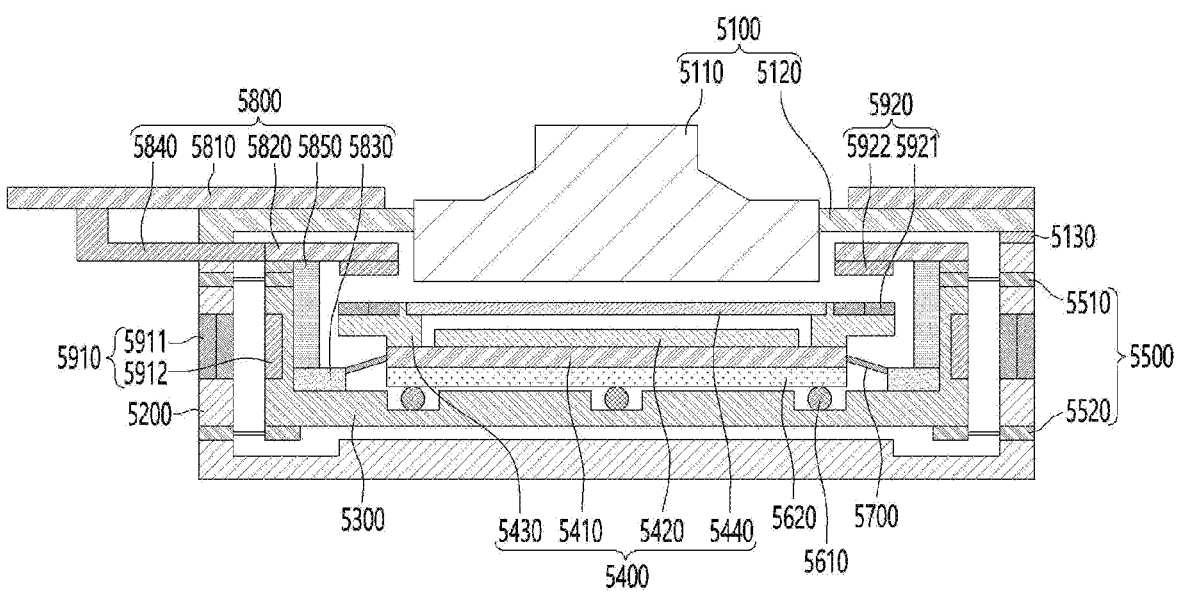

【FIG. 8】
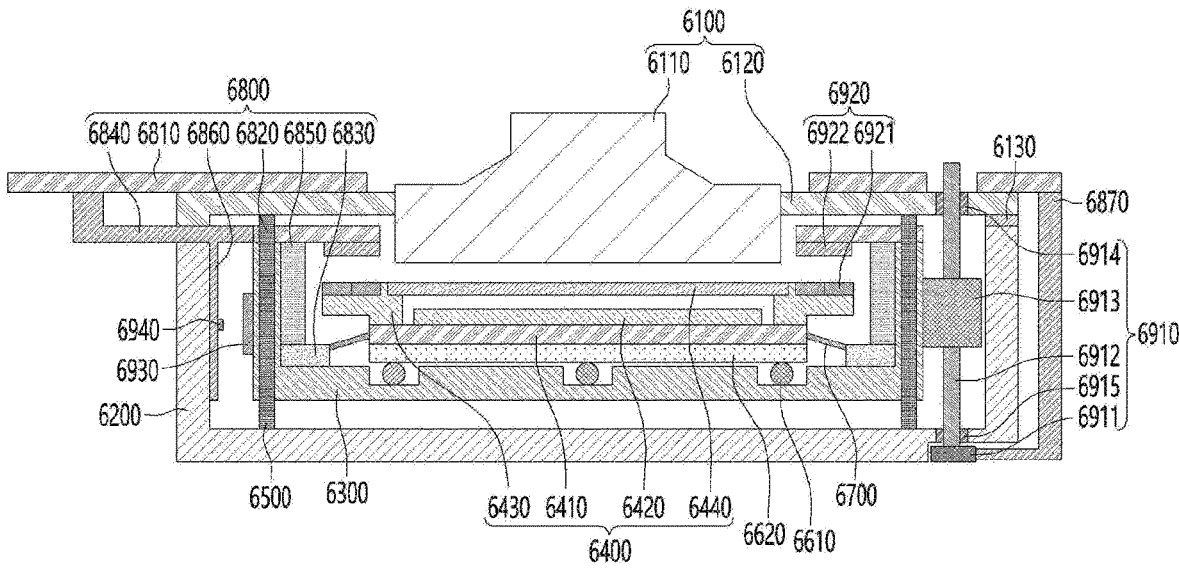
【FIG. 9】
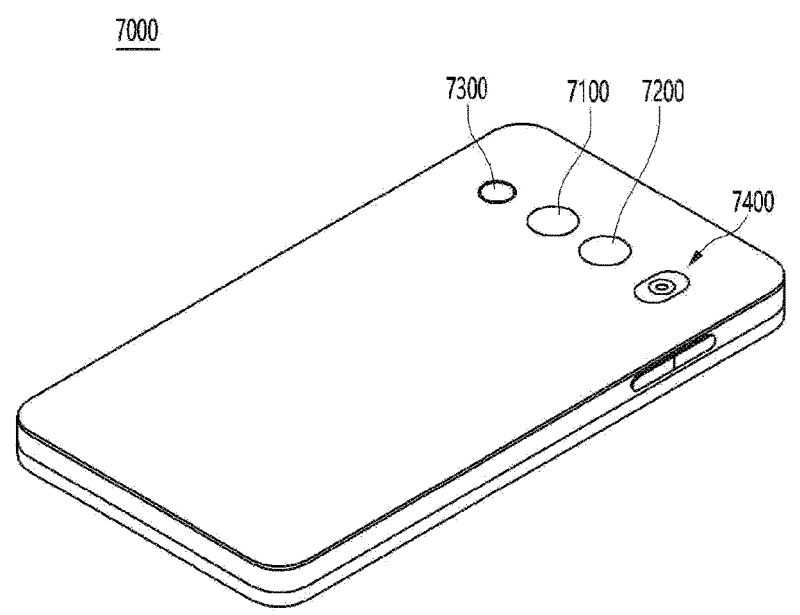

【FIG. 10】
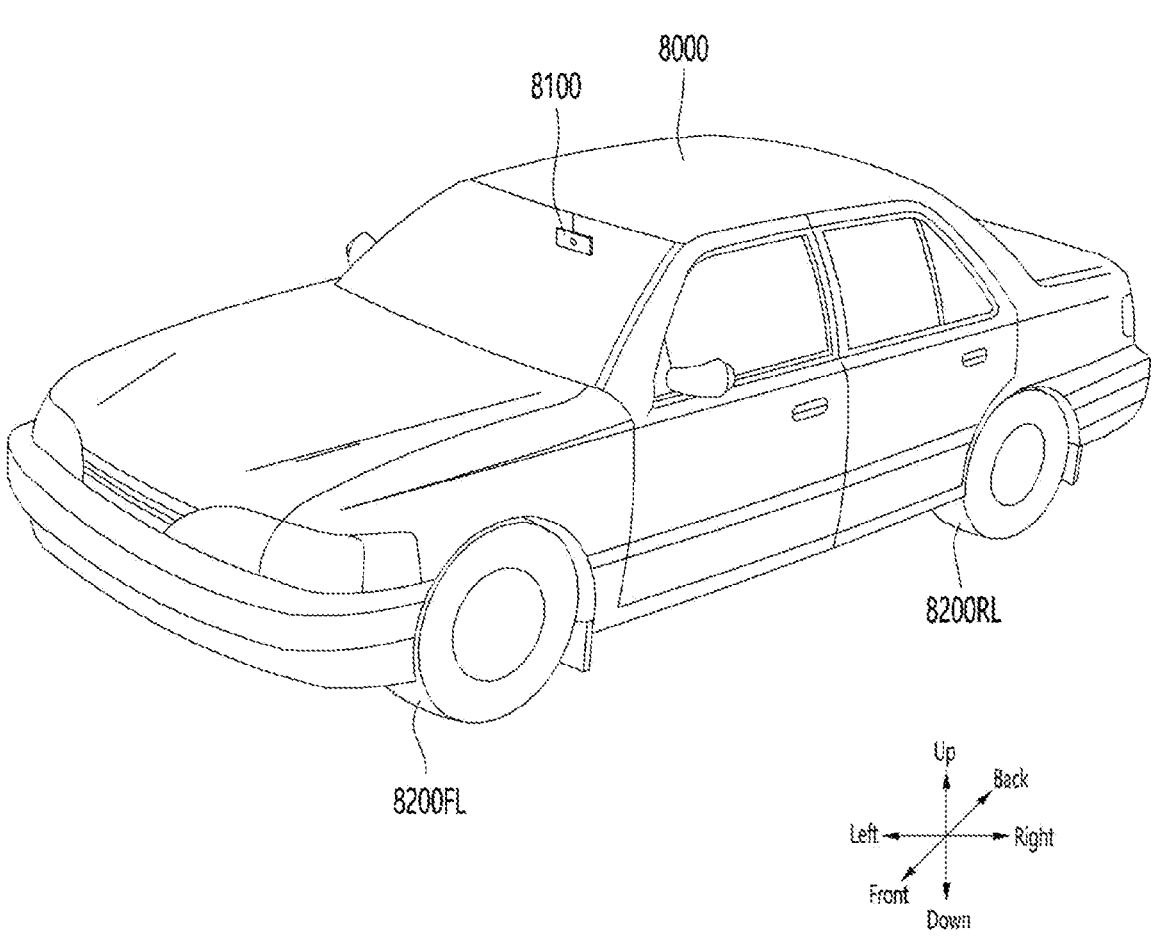

SENSOR DRIVING DEVICE AND CAMERA MODULE INCLUDING SAME

CROSS REFERENCE TO RELATED APPLICATIONS

This application is the National Phase of PCT International Application No. PCT/KR2022/012213, filed on Aug. 16, 2022, which claims priority under 35 U.S.C. 119(a) to Patent Application No. 10-2021-0107831, filed in the Republic of Korea on Aug. 17, 2021, all of which are hereby expressly incorporated by reference into the present application.

TECHNICAL FIELD

The embodiment relates to a sensor driving device, and in particular, to a sensor driving device including an image sensor capable of moving relative to a lens barrel and a camera module including the same.

BACKGROUND ART

As various portable terminals are widely used and a wireless Internet service is commercialized, needs of consumers related to the portable terminals are diversified, and various kinds of additional devices are installed in the portable terminals.

A representative example is a camera module that takes photos or videos of a subject. Meanwhile, a recent camera module can perform an autofocus (AF) function that automatically adjusts a distance between an image sensor and a lens to align a focal length of the lens.

In addition, the camera module can perform a zooming function of zooming up or zooming out to capture images by increasing or decreasing the magnification of a distant subject through a zoom lens.

Additionally, a recent camera module provides image stabilization (IS) technology, so that technology is being provided to correct or prevent image shake caused by unstable fixtures, user movement, or camera movement due to vibration or shock.

However, a lens shift in x-axis/y-axis directions used in conventional hand shake correction modules has limitations in correcting various types of shake.

DISCLOSURE

Technical Problem

An embodiment provides a sensor driving device capable of correcting for hand shake by performing rotation around a z-axis while moving in a x-axis direction and a y-axis direction, and a camera module including the same.

Additionally, the embodiment provides a sensor driving device capable of autofocusing through movement in the z-axis direction and a camera module including the same.

Additionally, the embodiment provides a sensor driving device capable of securing design freedom of the lens module by fixing a position of the lens module, and a camera module including the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A sensor driving device according to an embodiment includes a fixed part; a first moving part disposed inside the fixed part and spaced apart from the fixed part; a second moving part disposed inside the first moving part and spaced apart from the first moving part, and including an image sensor; a first driving part that moves the first moving part relative to the fixed part; and a second driving part that moves the second moving part relative to the first moving part, wherein the first driving part is provided to move the first moving part based on a first driving force corresponding to a first driving method, and the second driving part is provided to move the second moving part based on a second driving force of a second driving method different from the first driving method.

In addition, the first driving part of the first driving method includes a piezoelectric ultrasonic motor, and the second driving part of the second driving method includes a voice coil motor.

In addition, the sensor driving device further comprises a lens part disposed on the fixed part, and wherein the lens part includes a lens barrel; and a lens holder coupled to the lens barrel and fixed to the fixed part.

In addition, the fixed part includes a first frame, wherein the first moving part includes a second frame disposed inside the first frame, wherein a first guide member is disposed between the first frame and the lens holder, and wherein the first guide member includes a guide pin that has one end coupled to the lens holder, other end coupled to the first frame, and penetrating the second frame in an optical axis direction.

In addition, the first driving part includes an extension bar disposed between the first frame and the second frame; a piezoelectric element coupled to the extension bar; and a fixing plate coupled between the extension bar and the second frame, and wherein the second frame is provided to be movable in a third axis direction corresponding to the optical axis by a driving force provided through the first driving part.

In addition, the first driving part includes a first buffering member disposed between the extension bar and the lens holder; and a second buffering member disposed between the extension bar and the first frame.

In addition, when the second frame of the first moving part moves in the third axis direction by the first driving part, the second moving part moves along with the second frame in the third axis direction.

In addition, the second moving part includes a sensor substrate on which the image sensor is disposed; a sensor base disposed on the sensor substrate; and a filter disposed on the sensor base.

In addition, the sensor driving device further comprises an elastic substrate disposed between the sensor substrate and the second frame, and wherein the elastic substrate includes a conductive pattern part that is electrically connected to the sensor substrate and elastically supports the sensor substrate with respect to the second frame.

In addition, the second driving part includes a magnet part disposed on the sensor base; and a coil part disposed on the second frame and corresponding to the magnet part, and wherein the second driving part is provided to move the second moving part relative to the second frame in a direction of a first axis perpendicular to the third axis and in a direction of a second axis perpendicular to the third axis and the first axis.

In addition, the sensor driving device further comprises a second guide member disposed between the second frame and the sensor substrate.

In addition, the second frame or the sensor substrate includes a heat dissipation plate, and the second guide member contacts the heat dissipation plate.

In addition, the sensor substrate includes a ground pattern, and the heat dissipation plate and the second guide member are connected to the ground pattern.

In addition, the sensor driving device of the embodiment further comprises a position detection part disposed between the first frame and the second frame and detecting the relative position of the second frame with respect to the first frame.

In addition, the position detection part includes a Hall sensor disposed on the first frame and a sensing magnet disposed on the second frame.

Effects of the Invention

According to the embodiment, OIS and AF of the camera module are implemented by moving the image sensor relative to the lens barrel, instead of moving the lens barrel in a comparative example. For example, the lens barrel of the embodiment maintains a fixed position. In addition, the image sensor of the embodiment may move in the x-axis direction, move in the y-axis direction, move in the z-axis direction, and rotate around the z-axis with respect to the lens barrel. Accordingly, the embodiment can implement stable AF operation and OIS operation with a small driving force by moving the image sensor instead of moving a relatively heavy lens barrel.

In addition, the embodiment arranges a heat dissipation plate and a second guide member on the second moving part including the image sensor. Accordingly, the embodiment can easily dissipate heat generated from the image sensor through the heat dissipation plate and the second guide member. Accordingly, the embodiment can improve the heat dissipation characteristics of the image sensor and thereby improve the operational reliability of the camera module.

In addition, the embodiment applies a piezoelectric element as a driving part to move the image sensor in a z-axis direction with respect to the lens barrel. Accordingly, the embodiment can move the image sensor using a piezoelectric element that can provide greater driving force than a voice coil motor, and accordingly, it enables more stable operation and thus increases a stroke corresponding to the moving range of the image sensor.

DESCRIPTION OF DRAWINGS

FIG. 1 is a view showing a camera module according to a comparative example.

FIG. 2 is a view showing a camera module according to a first embodiment.

FIG. 3 is a view showing a camera module according to a second embodiment.

FIG. 4 is a view showing a camera module according to a third embodiment.

FIG. 5 is a view showing a camera module according to a fourth embodiment.

FIG. 6 is a view showing a camera module according to a fifth embodiment.

FIG. 7 is a view showing a camera module according to a sixth embodiment.

FIG. 8 is a view showing a camera module according to a seventh embodiment.

FIG. 9 shows a mobile terminal to which a camera module according to an embodiment is applied.

FIG. 10 is a perspective view of a vehicle to which a camera module according to an embodiment is applied.

BEST MODE

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. Further, the terms used in the embodiments of the present invention are for describing the embodiments and are not intended to limit the present invention.

In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (A, and (b) may be used.

These terms are only used to distinguish the elements from other elements, and the terms are not limited to the essence, order, or order of the elements. In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

"Optical axis direction" used below is defined as an optical axis direction of a lens and/or an image sensor coupled to a sensor driving device.

"Vertical direction" used below may be a direction parallel to the optical axis direction. The vertical direction may correspond to "z-axis direction". That is, an optical axis direction, a vertical direction, and a third axis direction described below may be substantially the same direction.

"Horizontal direction" used below may be a direction perpendicular to the vertical direction. That is, the horizontal direction may be a direction perpendicular to the optical axis. Therefore, the horizontal direction may include "x-axis direction" and "y-axis direction". Meanwhile, the 'x-axis direction' may be substantially the same direction as the first axis direction described below, and the 'y-axis direction' may be substantially the same direction as the second axis direction described below.

"Auto focus function" used below is defined as a function for automatically adjusting a focus on a subject by adjusting a distance from an image sensor and moving a lens in the optical axis direction according to the distance of the subject so that a clear image of the subject may be obtained on the image sensor. Meanwhile, "auto focus" may correspond to "AF (Auto Focus)".

"hand shake correction function" used below is defined as a function of moving the lens and/or the image sensor so as to cancel vibration (movement) generated in the image sensor by external force. Meanwhile, "Camera shake correction function" may correspond to "Optical Image Stabilization (OIS).

Hereinafter, an embodiment of the present disclosure will be described in detail with reference to the accompanying drawings.

FIG. 1 is a view showing a camera module according to Comparative Example.

A camera module having an optical image stabilizer (OIS) function and an Auto Focusing (AF) function requires at least two spring plates.

The camera module according to the comparative example may have two spring plates. The camera module according to the comparative example requires an elastic member such as at least six springs for the spring plate.

Referring to FIG. 1, the camera module according to the comparative example includes an optical system including a lens assembly, an infrared cut-off filter, and a sensor unit. That is, the camera module according to the comparative example includes a lens barrel 10, a lens assembly 20, a first elastic member 31, a second elastic member 32, a first housing 41, a housing 42, an infrared cut-off filter 50, a sensor unit 60, a circuit board 80, and drivers 71, 72, and 74.

In this case, the lens barrel 10 is connected to the first housing 41. That is, the lens barrel 10 is connected to the first housing 41 via the first elastic member 31. That is, the lens barrel 10 is connected to the first housing 41 so as to be movable by the first elastic member 31. In this case, the first elastic member 31 includes a plurality of springs (not shown). For example, the first elastic member 31 connects between the lens barrel 10 and the first housing 41 at a plurality of points of the lens barrel 10.

The second elastic member 32 is connected to the first housing 41 and the second housing 42 accommodating the first housing 41. The second elastic member 32 fixes the first housing 41 to the second housing 42 so as to be movable. The second elastic member 32 includes a plurality of springs. In detail, the second elastic member 32 includes a plate-shaped spring.

In this case, the first elastic member 31 moves the lens barrel 10 relative to the sensor unit 60 in a vertical direction (a Z-axis direction) while supporting the lens barrel 10. To this end, the first elastic member 31 includes at least four springs.

In addition, the second elastic member 32 moves the lens barrel 10 relative to the sensor unit 60 in a horizontal direction (an X-axis direction and a Y-axis direction) while supporting the lens barrel 10. To this end, the second elastic member 32 includes at least two springs.

As described above, in the camera module according to the comparative example, OIS and AF are performed as the lens barrel 10 moves in X-axis, Y-axis, and Z-axis directions. To this end, the camera module according to the comparative example requires at least six elastic members such as springs. In addition, the camera module according to the comparative example requires two spring plates for supporting the elastic member as described above. Further, the camera module according to the comparative example requires an additional member such as an elastic wire for fixing the Z-axis of the lens barrel 10. Therefore, the camera module according to the comparative example has a complicated spring structure for moving the lens barrel in the X-axis, Y-axis and Z-axis directions.

In addition, in the camera module according to the comparative example, it is necessary to manually perform an operation of bonding the respective elastic members in order to couple the elastic member with the lens barrel 10. Accordingly, the camera module according to the comparative example has a complicated manufacturing process and requires a long manufacturing time.

In addition, the camera module according to the comparative example provides a tilt function of the lens barrel 10, but has a structure in which tilt correction of an image is substantially difficult. That is, even though the lens barrel 10 rotates with respect to the sensor unit 60, an image incident on the sensor unit 60 does not change, and thus the tilt correction of the image is difficult, and further, the tilt function itself is unnecessary.

Meanwhile, camera module performance has recently improved, resulting in higher resolution, and the number of lenses is increasing accordingly. Additionally, as the number of lenses increases, the weight of the lens part increases.

However, the camera module in the comparative example uses a VCM (Voice coil motor) as a driver to move the lens, so there is a problem in that the driving force is limited. The driving force through magnetic force in an actuator using VCM is difficult to increase infinitely due to its characteristics, and as a result, there is a problem that stability is deteriorated when moving a lens with a high weight.

FIG. 2 is a view showing a camera module according to a first embodiment.

A camera module of the embodiment may include a sensor driving device.

The sensor driving device may be a sensor actuator that drives a sensor (specifically, an image sensor). For example, the sensor driving device may be a voice coil motor. The sensor driving device may be a sensor driving motor. The sensor driving device may be a sensor driving actuator. The sensor driving device may be an AF actuator. For example, the sensor actuator may be an OIS actuator.

Specifically, the camera module may include an actuator. The actuator may drive an image sensor 420. For example, the actuator may tilt the image sensor 420. For example, the actuator may move the image sensor 420. For example, the actuator may rotate the image sensor 420.

In more detail, the actuator may move the image sensor 420 in a first axis direction perpendicular to an optical axis. For example, the actuator may move the image sensor 420 in a second axis direction perpendicular to the optical axis and the first axis direction. For example, the actuator may rotate the image sensor 420 based on the optical axis. For example, the actuator may move the image sensor 420 in a third axis direction corresponding to the optical axis. At this time, the first axis direction may mean a x-axis direction, the second axis direction may mean a y-axis direction, and the optical axis may mean a z-axis direction or a third axis direction.

Through this, the actuator can drive a hand shake correction function by moving the image sensor 420 in the first axis direction, moving the image sensor 420 in the second axis direction, and rotating the image sensor 420 about the third axis (optical axis). Additionally, the actuator may drive the autofocus function by moving the image sensor 420 in the third axis direction.

To this end, the actuator of the embodiment may include a driving part. The driving part of the actuator may include a first driving part for driving auto focus (AF) and a second driving part for driving image stabilization (OIS). And, the first driving part may include a first coil part and a first magnet part. Additionally, the second driving part may include a second coil part and a second magnet part.

Such an actuator can move the image sensor 420 relative to a lens part. This will be explained in more detail below.

The camera module of the embodiment may be divided into a fixed part and a moving part.

The fixed part may mean a fixed configuration whose position does not move even when the first driving part and the second driving part of the actuator are driven.

For example, the camera module of the embodiment may include a fixed part 200. A position of the fixed part 200 may be fixed without moving even during AF operation or OIS operation according to the movement of the image sensor 420. For example, the fixed part 200 may be coupled to the lens part 100. Accordingly, the lens part 100 of the embodiment may also be said to be a component of the fixed part 200. Specifically, in the embodiment, the lens part 100 maintains a fixed position without moving during AF operation or OIS operation. Accordingly, the lens part 100 may also be included in the fixed part 200.

Additionally, the embodiment may include a circuit board 800. The circuit board 800 can supply power to each component constituting the camera module. At this time, the circuit board 800 may include a plurality of substrate regions. Additionally, the plurality of substrate regions may be divided into a rigid region and a flexible region. Also, in the circuit board 800, at least some of the rigid region may maintain a fixed position without moving when AF or OIS is driven by the actuator. Accordingly, a portion of the rigid region of the circuit board 800 may be included in the fixed part 200. Additionally, in the circuit board 800, the remaining part of the rigid region may move together with the moving part when AF or OIS is driven by the actuator. Accordingly, the remaining part of the rigid region of the circuit board 800 may be referred to as a moving part whose position moves when AF or OIS is driven by the actuator. Additionally, the flexible region of the circuit board 800 may connect a plurality of rigid regions of the circuit board 800.

As described above, the camera module of the embodiment includes a fixed part 200, and the fixed part 200 may be a part whose position does not change and remains fixed when the moving part moves according to AF driving or OIS driving by the actuator.

The camera module of the embodiment may include a moving part.

For example, the camera module of the embodiment may include a moving part whose position changes when the AF or OIS of the actuator is driven.

At this time, the moving part of the camera module of the embodiment may include a first moving part 300 and a second moving part 400.

The first moving part 300 may be disposed in an inner space of the fixed part 200. The first moving part 300 may be disposed in an inner space of the fixed part 200 and spaced apart from the fixed part 200.

The first moving part 300 may move relative to the fixed part 200 in the inner space of the fixed part 200. For example, the first moving part 300 may move in the optical axis direction with respect to the fixed part 200 in the inner space of the fixed part 200. For example, the first moving part 300 may be an AF module for AF driving to move with respect to the fixed part 200 in the third axis direction corresponding to the optical axis direction.

That is, the first moving part 300 can move with respect to the fixed part 200 in a +z-axis direction (e.g., upward direction) and −z-axis direction (e.g., downward direction) in the inner space of the fixed part 200. At this time, the lens part 100 is placed on the first moving part 300. And, the lens part 100 is maintained in a fixed position together with the fixed part 200. At this time, when the first moving part 300 moves relative to the fixed part 200 in the third axis direction in the inner space of the fixed part 200, a distance between the first moving part 300 and the lens part 100 may change. Through this, the embodiment can perform an auto-focusing operation as the first moving part 300 moves relative to the fixed part 200 and the lens part 100 in the third axis direction. However, the embodiment is not limited thereto.

For example, the first moving part 300 can move in the first axis direction, move in the second axis direction, and rotate about the third axis with respect to the fixed part 200 in the inner space of the fixed part 200. And, in this case, the first moving part 300 may perform a hand shake correction operation. For example, when the first moving part 300 has a movement structure as described above, the first moving part 300 may be an OIS module. This can be achieved by changing the arrangement positions of the first driving part 910 and the second driving part 920, which will be described below.

The moving part of the embodiment includes a second moving part 400. At this time, the second moving part 400 may be disposed in an inner space of the first moving part 300. Also, the second moving part 400 may move relative to the fixed part 200 and the first moving part 300. For example, the second moving part 400 can move in the first axis direction, move in the second axis direction, and rotate about the third axis with respect to the fixed part 200 and the first moving part 300. For example, the second moving part 400 may perform a hand shake correction operation. For example, the second moving part 400 may be an OIS module.

However, as described above, when the first moving part 300 is an OIS module performing an OIS operation, the second moving part 400 may be an AF module performing an AF operation. For example, if changing the arrangement structure between the first driving part 910 and the second driving part 920 described below, the second moving part 400 may also operate as an AF module that moves relative to the fixed part 200 and the first moving part 300 in the third axis direction.

Meanwhile, the second moving part 400 may be linked to the movement of the first moving part 300. For example, the second moving part 400 may move together with the first moving part 300. For example, when the first moving part 300 moves relative to the fixed part 200, the second moving part 400 may move relative to the fixed part 200 together with the first moving part 300. Specifically, the actuator of the camera module of the embodiment may move the second moving part 400 together with the first moving part 300 relative to the fixed part 200. Furthermore, the actuator of the camera module of the embodiment may move the second moving part 400 relative to the first moving part 300 and the fixed part 200.

The actuator of the camera module of the embodiment may include a guide member. For example, the guide member may guide the first moving part 300 to move relative to the fixed part 200. For example, the guide member may guide the fixed part 200 and the second moving part 400 to enable relative movement. The guide member may be omitted depending on the embodiment. This will be explained in more detail below.

Meanwhile, the guide member may be a rolling member, or alternatively, the guide member may be a pressing member (or elastic member). For example, the guide member may include a plurality of balls in a rolling motion, a movement of at least one moving part of the first moving part 300 and the second moving part 400 may be guided through the plurality of balls. For example, the guide member may include a plurality of elastic members performing a pressing operation, a movement of at least one of the first moving part 300 and the second moving part 400 may be guided through the plurality of elastic members.

The guide member of the first embodiment may include a first guide member 500 and a second guide member 600.

Additionally, the first guide member 500 may guide the movement of the first moving part 300 with respect to the fixed part 200. Additionally, the second guide member 600 may guide the movement of the second moving part 400 with respect to the first moving part 300. In addition, the first guide member 500 and the second guide member 600 of the first embodiment may each be a rolling member. For example, the first guide member 500 of the first embodiment may be a first rolling member including a plurality of first balls. For example, the second guide member 600 of the first embodiment may be a second rolling member including a plurality of second balls.

Meanwhile, the camera module of the embodiment may include an elastic substrate 700. The elastic substrate 700 may electrically connect the fixed part 200 and the second moving part 400. For example, the elastic substrate 700 may electrically connect the circuit board 800 and the second moving part 400. At this time, the elastic substrate 700 electrically and elastically connects the circuit board 800 and the image sensor 420, so that the second moving part 400 can move relative to the first moving part 300. For example, the elastic substrate 700 may include a "pattern part" that bends elastically when the second moving part 400 moves.

Hereinafter, the lens part 100, the fixed part 200, the first moving part 300, the second moving part 400, the first guide member 500, the second guide member 600, the elastic substrate 700, and circuit board 800 of the actuator constituting the sensor driving device will be described in detail.

The lens part 100 may include a lens barrel 110 that accommodates a lens and a lens holder 120 that fixes the lens barrel 110 to the fixed part 200.

The lens barrel 110 may include a plurality of lenses. For example, a plurality of lenses may be arranged in the optical axis direction and may be disposed in a receiving space of the lens barrel 110. Three lenses may be disposed within the lens barrel 110. For example, five lenses may be disposed within the lens barrel 110. For example, seven lenses may be disposed within the lens barrel 110. For example, nine lenses may be disposed within the lens barrel 110. Preferably, the camera module of the embodiment may be any one of a wide-angle camera, a macro camera, and a high-magnification camera. Additionally, lenses for implementing any one of wide-angle, macro, and high magnification cameras may be disposed within the lens barrel 110.

The lens holder 120 may fix the lens barrel 110 to the fixed part 200. For example, the lens holder 120 may be referred to as a lens base, a lens housing, or a lens fixing part for fixing the lens barrel 110 to the fixed part 200.

The lens holder 120 may include at least one opening (not shown). For example, the lens holder 120 may include at least one opening (not shown) through which the circuit board 800 enters and exits. For example, at least a portion of the circuit board 800 may be disposed within an inner space formed through the lens holder 120 and the fixed part 200. In addition, the remaining portion of the circuit board 800 may be placed outside the inner space formed through the lens holder 120 and the fixed part 200 through an opening (not shown) of the lens holder 120.

Meanwhile, an adhesive member 130 may be disposed on one end of the lens holder 120. The adhesive member 130 may be an adhesive for fixing the lens holder 120 to the fixed part 200. The adhesive member 130 can prevent foreign substances from entering between the fixed part 200 and the lens holder 120 while allowing the lens holder 120 to be stably placed on the fixed part 200.

The adhesive member 130 may be implemented with any one of epoxy, thermosetting adhesive, and ultraviolet curing adhesive in order to prevent foreign substances from entering in addition to the adhesive function.

The lens holder 120 may be fixedly disposed on the fixed part 200 through the adhesive member 130.

Through this, the lens holder 120 and the lens barrel 110 coupled to the lens holder 120 are fixed to the fixed part 200, and will be able to function as a fixed part whose position does not change.

The fixed part 200 of the embodiment may include a first frame. For example, fixed part 200 may also be referred to as a first frame. Accordingly, hereinafter, the fixed part 200 will be described as the first frame.

A first frame 200 may have an accommodation space therein. For example, the first frame 200 may be combined with the lens holder 120, thereby forming an inner space together with the lens holder 120.

For example, the first frame 200 may have a square shape with a space inside. However, the embodiment is not limited to this, and the first frame 200 may have a circular shape or a polygonal shape in addition to a square shape.

The first frame 200 may include a plurality of side walls surrounding an inner space. For example, the first frame 200 may include first to fourth sidewalls, but is not limited thereto.

The first frame 200 may include a seating portion (not shown) where a portion of the first driving part 910 is disposed. For example, the first frame 200 may include a first magnet seating portion where ae first magnet part 911 of the first driving part 910 is disposed. Accordingly, the first frame 200 may also be referred to as a first magnet holder on which the first magnet part 911 is seated.

The first magnet seating portion formed in the first frame 200 may have a groove shape formed on the inner wall of the first frame 200. Additionally, the first magnet part 911 may be inserted and fixed into a groove formed on the inner wall of the first frame 200. At this time, the first magnet part 911 is seated on the first magnet seating portion of the first frame 200, and thus can directly face the inner space of the first frame 200. For example, a magnet having at least one polarity constituting the first magnet part 911 may be exposed and disposed in a direction toward the inner space of the first frame 200.

At this time, the first magnet seating portion may be formed on each of a plurality of side walls of the first frame 200. For example, when the first frame 200 has four side walls, the first magnet seating portion may be formed on each inner surface of the four side walls of the first frame 200. In addition, the first magnet part 911 can include first-first to first-fourth magnets (not shown) and can be arranged to be seated on four first magnet seating portions formed on each of the four side walls of the first frame 200. Through this, the embodiment can provide a uniform and sufficient driving force to move the first moving part 300 in the third axis direction with respect to the fixed part 200. For example, if the first magnet part 911 is disposed only on a specific side wall of the first frame 200, sufficient magnetic force may not be provided by the first magnet part 911 to move the first moving part 300 in the third axis direction. For example, if the first magnet part 911 is disposed only on a specific side wall of the first frame 200, uniform magnetic force is not provided to an entire region of the first moving part 300, and accordingly, the first moving part 300 can move in the third axis direction while being tilted in the first or second axis direction. Accordingly, the embodiment allows first magnet seating portions to be formed in each of a plurality of regions of the first frame 200 in order to move the first moving part 300 stably and reliably. Accordingly, the first magnet part 911 can be disposed on each of the plurality of first magnet seating portions.

Meanwhile, the first frame 200 may further include a first guide member seating portion (not shown) on which the first guide member 500 is disposed or seated. For example, a first guide member seating portion on which the first guide member 500 described below is seated may be formed on an inner surface of at least one of the four side walls of the first frame 200. The first guide member seating portion may have a groove shape that is recessed in an outward direction from the inner surface of the side wall of the first guide member 500. The number of first guide member seating portions may correspond to the number of first guide members 500.

For example, the first guide member 500 may include a plurality of first balls. At this time, the first guide member 500 may be formed to correspond to the first magnet part 911 seated on the first frame 200. For example, the first guide member 500 may include first-first to first-fourth guide members (not shown) respectively disposed in different regions. The first-first to first-fourth guide members may correspond to the first-first to first-fourth magnets. The first-first to first-fourth guide members may be disposed adjacent to the first-first to first-fourth magnets. For example, the first-first guide member may be disposed adjacent to the first-first magnet. For example, the first-second guide member may be disposed adjacent to the first-second magnet. For example, the first-third guide member may be disposed adjacent to the first-third magnet. For example, the first-fourth guide member may be disposed adjacent to the first-fourth magnet. Through this, the first guide member 500 is disposed adjacent to the first magnet part 911, so that the first moving part 300 can be guided to move stably in the third axis direction by the magnetic force provided by the first magnet part 911.

Meanwhile, each of the first-first to first-fourth guide members may include a plurality of first balls. For example, as shown in the drawing, each of the first-first to first-fourth guide members may include three first balls. Accordingly, the first guide member 500 of the embodiment may include twelve first balls. In addition, a groove in which the twelve first balls are seated or disposed may be formed in the first frame 200. A portion of the first guide member 500 may be disposed on the first guide member seating portion of the first frame 200. For example, a portion of the first ball may be inserted and placed in the first guide member seating portion of the first frame 200. The first guide member 500 may perform a rolling motion in a state where a portion of the first guide member 500 is disposed within the first guide member seating portion of the first frame 200, so that the first moving part 300 can stably move in the third axis direction.

A moving part may be disposed within the first frame 200. The moving part may include a first moving part 300 and a second moving part 400, and these may constitute one moving module. Additionally, the moving module is disposed within the first frame 200, which is the fixed part 200, and can move relative to the first frame 200. For example, the first moving part 300 may move in the third axis direction within the first frame 200. At this time, when the first moving part 300 moves in the third axis direction, the second moving part 400 disposed within the first moving part 300 may also move in the third axis direction together with the first moving part 300.

The first moving part 300 may include a second frame. For example, the first moving part 300 may also be referred to as a second frame. Accordingly, hereinafter, the first moving part 300 will be described as a second frame.

The second frame 300 may have an accommodation space therein. For example, the second frame 300 may be disposed in an inner space of the first frame 200 and spaced apart from the first frame 200. Additionally, the second frame 300 may form an inner space where the second moving part 400 is disposed.

For example, the second frame 300 may have a square shape with a space inside. However, the embodiment is not limited to this, and the second frame 300 may have a circular shape or a polygonal shape in addition to a square shape.

The second frame 300 may include a plurality of side walls surrounding an inner space, and a bottom portion below the plurality of side walls. For example, the second frame 300 may include first to fourth side walls and a first bottom portion, but is not limited thereto.

The second frame 300 may include a seating portion (not shown) where a portion of the first driving part 910 is disposed. For example, the second frame 300 may include a first coil seating portion where the first coil part 912 of the first driving part 910 is disposed. Accordingly, the second frame 300 may also be referred to as a first coil holder on which the first coil part 912 is seated.

The first coil seating portion formed in the second frame 300 may have a through-hole shape penetrating inner and outer surfaces of the side wall of the second frame 300. Accordingly, the first coil part 912 may face the first magnet part 911 seated on the first frame 200 while being disposed on the first coil seating portion of the second frame 300.

At this time, at least a portion of the circuit board 800 is disposed on the second frame 300, and thus may be used as a coil substrate on which the first coil part 912 is disposed.

The first coil part 912 may correspond to the first magnet part 911. Accordingly, the first coil part 912 may include first-first to first-fourth coils (not shown), corresponding to the first magnet part 911. Accordingly, the embodiment may move the second frame 300 of the first moving part 300 upward with respect to the first frame 200 of the fixed part based on the third axis by applying a current in the first direction to the first-first to first-fourth coils. Additionally, the embodiment may move the second frame downward with respect to the first frame 200 based on the third axis by applying a current in the second direction to the first-first to first-fourth coils.

Meanwhile, a first guide member seating portion on which the first guide member 500 is seated may be formed in the second frame 300.

A first guide member seating portion may be formed in the second frame 300 to correspond to the first frame 200.

Accordingly, a portion of the first guide member 500 may be inserted and seated in the first frame 200, and at least the remaining portion may be inserted and seated in the second frame 300.

Meanwhile, although not shown in the drawings, a yoke (not shown) may be disposed on the inner surface of the side wall of the second frame 300. The yoke may overlap the first magnet part 911 in the first or second axis direction. The yoke may generate attractive force together with the first magnet part 911. Accordingly, the second frame 300 can be supported to the first guide member 500 and the first frame 200 through the yoke. For example, the yoke may be a pressing member that presses the second frame 300 in a direction toward the first frame 200. Accordingly, the second frame 300 of the embodiment may move in the third axis direction with respect to the first frame 200 in a state supported on the first guide member 500 by a force applied through the yoke.

Meanwhile, at least one groove may be formed in the bottom portion of the second frame 300. For example, a second guide member seating portion may be formed on an upper surface of the bottom portion of the second frame 300. The second guide member seating portion may be a groove 310 recessed in the downward direction on the upper surface of the bottom portion of the second frame 300.

The second guide member 600 may be seated and placed in the groove 310 formed in the bottom portion of the second frame 200. The second guide member 600 may include a plurality of second balls. Accordingly, a plurality of grooves 310 may be formed in the bottom portion of the second frame 300 at positions spaced apart from each other at a predetermined distance. Additionally, the second guide member 600 may be placed and seated within the groove 310 of the second frame 300.

The second guide member 600 may be in contact with the second moving part 400 accommodated in the inner space of the second frame 300 while being seated in the groove 310 of the second frame 300. For example, the second guide member 600 may include a plurality of second balls. And, the plurality of second balls may contact the second moving part 400. At this time, the second guide member 600 may be disposed on the bottom portion of the second frame 300 in the first axis direction or the second axis direction. In addition, the second guide member 600 may guide the second moving part 400 disposed within the second frame 300 to stably move in the first or second axis direction with respect to the second frame 300.

Meanwhile, the first coil part 912 of the embodiment may include a first coil and a first Hall sensor. The first Hall sensor may output change information of magnetic force that changes depending on the position of the first magnet part 911. Through this, the embodiment can feedback relative position information of the second frame 300 with respect to the first frame 200, and accordingly, feedback control can be performed so that the second frame 300 can accurately move to the target position.

Meanwhile, the second guide member 600 of the embodiment is disposed between the second moving part 400 and the second frame 300, and accordingly, the second guide member can guide the movement of the second moving part 400 in the first axis direction and the movement in the second axis direction with respect to the first moving part 300.

In addition, a size of the image sensor 420 has recently tended to increase due to higher resolution, and accordingly, various attempts have been made to improve the heat dissipation characteristics of the image sensor 420. At this time, in the case of a lens movement method, the image sensor remains fixed, so various heat dissipation plates are attached to the image sensor, thereby improving the heat dissipation characteristics of the image sensor. However, in the case of a sensor movement method that moves the image sensor 420 as in the present application, the image sensor must remain floating within the second frame 300, and the heat dissipation characteristics of image sensors are deteriorating. At this time, the embodiment allows the second guide member 600 to contact the second moving part 920 including the image sensor 420, and allows guiding the movement of the second moving part 400 via the second guide member 600. Furthermore, in an embodiment, the second guide member 600 may also function as a heat transfer path that radiates heat generated in the image sensor 420 constituting the second moving part 400 to an outside. Accordingly, the embodiment can further improve the heat dissipation characteristics of the image sensor, which is vulnerable in the sensor movement method, and thereby improve the performance of the actuator.

Meanwhile, the second moving part 400 is disposed in the inner space of the first moving part 300. For example, the second moving part 400 is disposed in the inner space of the second frame 300 constituting the first moving part.

The second moving part 400 includes a sensor substrate 410, an image sensor 420, a sensor base 430, and a filter 440. The sensor substrate 410, image sensor 420, sensor base 430, and filter 440 may form a sensor module.

The second moving part 400 is disposed in the inner space of the second frame 300. Preferably, the second moving part 400 may be disposed to be spaced apart from the second frame 300 in an inner space of the second frame 300.

Preferably, the sensor substrate 410 of the second moving part 400 may be disposed on the second guide member 600. The sensor substrate 410 is disposed on the second guide member 600, and accordingly, it can move in the first axis direction or the second axis direction along the second guide member 600 by the driving force provided by the second driving part 920.

The image sensor 420 may be mounted on the sensor substrate 410. The image sensor 420 may be mounted on the sensor substrate 410 using a wire bonding method, or alternatively, may be coupled using surface mounting technology (SMT). As another example, the image sensor 420 may be coupled to the sensor substrate 410 using flip chip technology. The image sensor 420 may be aligned with the optical axis of the lens accommodated in the lens barrel 110. The image sensor 420 may convert light irradiated to an effective image region into an electrical signal. For example, the image sensor 420 may be one of a charge coupled device (CCD), a metal oxide semiconductor (MOS), a CPD, and a CID.

The image sensor 420 of the embodiment can move in the first axis direction, move in the second axis direction, and rotate about the third axis, and OIS driving can be performed based on this. For example, when the second moving part 400 moves relative to the first moving part 300, the image sensor 420 may move correspondingly, and OIS may be driven accordingly.

Additionally, the image sensor 420 of the embodiment may move in the third axis direction. For example, when the first moving part (300) moves with respect to the fixed part 200, the second moving part 400 moves together with the first moving part 300, and accordingly, the image sensor 420 included in the second moving part 400 may be moved. Accordingly, in the embodiment, when the first moving part (300) moves in the third axis direction with respect to the fixed part 200, AF drive corresponding to this may be performed.

A sensor base 430 may be disposed on the sensor substrate 410. The sensor base 430 may be provided with a filter seating portion (not shown) on which the filter 440 is seated. Additionally, an adhesive member (not shown) may be applied to the filter seating portion of the sensor base 430, and accordingly, the filter 440 can be seated on the sensor base 430. The filter seating portion may have the shape of any one of a recess, a cavity, and a hole recessed from an upper surface of the sensor base 430. For example, the filter seating portion of the sensor base 430 may be formed to protrude in the optical axis direction along a side surface of the filter 440. For example, the filter seating portion corresponding to a protrusion formed to surround the side surface of the filter 440 may be formed on the sensor base 430. The upper surface of the protrusion may be located higher in the optical axis direction than the upper surface of the filter 440. When the second moving part 400 moves in the third axis direction or the filter 440 moves in the direction toward the lens barrel 110 due to an external impact, this is to prevent the filter 440 and the lens barrel 110 from directly colliding with each other. At this time, an opening (not shown) may be provided in a region where the filter 440 of the sensor base 430 is mounted or seated, so that light passing through the filter 440 may be incident on the image sensor 420. For example, the opening (not shown) may penetrate the sensor base 430 in the optical axis direction, and accordingly, the opening can be referred to a through hole. The opening (not shown) may pass through a center of the sensor base 430, and an area of the opening (not shown) may be smaller than the area of the filter 440.

The sensor base 430 as described above can be disposed on the sensor substrate 410 and can accommodate a filter 440 therein.

A filter 440 may be disposed on the sensor base 430. The filter 440 may serve to block light of a specific frequency band from light passing through the lens barrel 110 from being incident on the image sensor 420. The filter 440 may be an infrared blocking filter, but is not limited thereto. The filter 440 may be arranged parallel to a plane corresponding to a first axis direction or a second axis direction perpendicular to the optical axis. The filter 440 may be mounted on the sensor base 430 using UV epoxy or the like.

Meanwhile, the sensor base 430 may also function as a seating portion where the second driving part 920 is disposed. For example, the sensor base 430 may be provided with a second magnet seating portion on which the second magnet part 921 of the second driving part 920 is seated. For example, a second magnet mounting portion on which the second magnet part 921 is mounted may be provided on an upper surface of the sensor base 430.

Additionally, the second moving part 400 may be electrically connected to the circuit board 800 through the elastic substrate 700. The elastic substrate 700 may include a plurality of terminal parts (not shown). For example, the elastic substrate 700 may include a first terminal connected to the sensor substrate 410 and a second terminal connected to the circuit board 800. Specifically, the elastic substrate 700 may include a conductive pattern portion (not shown) that elastically supports the second moving part 400 with respect to the first frame 200 while electrically connecting the circuit board 800 and the sensor substrate 410. The conductive pattern portion of the elastic substrate 700 may have elasticity while electrically connecting the circuit board 800 and the sensor substrate 410, so that the second moving part 400 can move relative to the first moving part 300. To this end, the conductive pattern portion of the elastic substrate 700 may be formed of a metal material having elasticity. For example, the conductive pattern portion of the elastic substrate 700 may have a tensile strength above a certain level that does not break even when the second moving part 400 moves. For example, the conductive pattern portion of the elastic substrate 700 may include a metal material having a tensile strength of 1000 MPa or more. The conductive pattern portion of the elastic substrate 700 may be a binary alloy of copper (Cu) and nickel (Ni). For example, the conductive pattern portion of the elastic substrate 700 may be a binary alloy of copper (Cu) and tin (Sn). For example, the conductive pattern portion of the elastic substrate 700 may be a binary alloy of copper (Cu) and beryllium (Be). For example, the conductive pattern portion of the elastic substrate 700 may be a binary alloy of copper (Cu) and cobalt (Co). For example, the conductive pattern portion of the elastic substrate 700 may be a ternary alloy of copper (Cu)-nickel (Ni)-tin (Sn). For example, the conductive pattern portion of the elastic substrate 700 may be a ternary alloy of copper (Cu)-beryllium (Be)-cobalt (Co). Additionally, the conductive pattern portion of the elastic substrate 700 may be formed of an alloy such as iron (Fe), nickel (Ni), or zinc, which has elasticity capable of acting as a spring and good electrical properties, in addition to the metal material. Additionally, the conductive pattern portion of the elastic substrate 700 may be surface treated with a plating layer containing a metal material such as gold (Au), silver (Ag), palladium (Pd), etc., thereby improving electrical conductivity.

The conductive pattern part of the elastic substrate 700 as described above can be formed by additive process, subtractive process, modified semi additive process (MSAP) and semi additive process (SAP) which is a typical circuit board manufacturing process, and detailed descriptions are omitted here.

Meanwhile, the second moving part 400 may move relative to the first moving part 300 by a driving force provided through the second driving part 920.

The second driving part 920 includes a second coil part 922 disposed on the second frame 300 through a circuit board 800. Additionally, the second driving part 920 includes a second magnet part 921 disposed on the sensor base 430. The second coil part 922 may correspond to the second magnet part 921. For example, the second coil part 922 may be arranged to face the second magnet part 921 in the optical axis direction. At this time, when a driving force is generated by the second driving part 920, one of the second coil part 922 and the second magnet part 921 moves relative to the other. At this time, the second coil part 922 is disposed on the second frame 300 through the circuit board 800. Accordingly, since the second coil part 922 cannot move in the first axis direction and the second axis direction by the first frame 200 and the first guide member 500, the second magnet part 921 moves relative to the second coil part 922 in the first or second axis direction. Accordingly, when a driving force is generated through the second driving part 920, the sensor base 430 on which the second magnet part 921 is disposed moves, and the sensor substrate 410, the image sensor 420, and the filter 440 coupled thereto can move relative to each other.

Meanwhile, the embodiment includes a circuit board 800. The circuit board 800 may control the operation of each component constituting the camera module of the embodiment.

The circuit board 800 may include a plurality of substrate regions.

The circuit board 800 may include a first substrate region 810. The first substrate region 810 may be disposed on the lens holder 120. The first substrate region 810 may be a rigid region. The first substrate region 810 may have various elements for operating an actuator. As an example, a driver element (not shown) for AF driving and OIS driving of the actuator may be disposed in the first substrate region 810. Additionally, a gyro sensor (not shown) for OIS control may be disposed in the first substrate region 810. Additionally, at least one connector (not shown) for connecting an external device and the camera module may be disposed in the first substrate region 810.

The circuit board 800 may include a second substrate region 820. The second substrate region 820 may be disposed on the second frame 300. The second substrate region 820 may be a coil substrate region where the second coil part 922 of the second driving part 920 is disposed. The second substrate region 820 may be a rigid region, but is not limited thereto.

The circuit board 800 may include a third substrate region 830. The third substrate region 830 may be disposed in an edge region of the bottom portion of the second frame 300. The third substrate region 830 may be electrically connected to the elastic substrate 700. The third substrate region 830 may be a rigid region, but is not limited thereto.

Meanwhile, the circuit board 800 may include a fourth substrate region 840 connecting the first substrate region 810 and the second substrate region 820. The fourth substrate region 840 may be a flexible region.

Additionally, the circuit board 800 may include a fifth substrate region 850 connecting the second substrate region 820 and the third substrate region 830. The fifth substrate region 850 may be a flexible region, but is not limited thereto. Meanwhile, the fifth substrate region 850 is disposed on the inner side of the side wall of the second frame 300, and may be a coil substrate region where the first coil part 912 is disposed. However, implementation is not limited to this. The second frame 300 may function as a bobbin on which the first coil part 912 is disposed. In addition, the first coil part 912 wound on the second frame 300 may be electrically connected to the circuit board 800 through an additional connection member (not shown), and through this, current can be applied in a specific direction.

According to the first embodiment of the present application, as described above, the actuator of the present application uses a sensor driving method rather than a lens driving method to enable not only OIS but also AF driving.

FIG. 3 is a view showing a camera module according to a second embodiment.

Referring to FIG. 3, the camera module according to the second embodiment has the same basic structure as the camera module according to the first embodiment of FIG. 2, but differs only in the first guide member.

For example, the camera module 1000 according to the second embodiment includes a lens part 1100. And, the lens part 1100 includes a lens barrel 1110 and a lens holder 1120. Meanwhile, an adhesive member 1130 may be applied between the lens holder 1120 and the first frame 1200 of the fixed part.

Meanwhile, the camera module of the second embodiment can include a fixed part 1200, a first moving part 1300, a second moving part 1400, a first guide member 1500, a second guide member 1600, an elastic substrate 1700, a circuit board 1800, a first driving part 1910, and a second driving part 1920.

Here, the fixed part 1200, the first moving part 1300, the second moving part 1400, the second guide member 160, the elastic substrate 1700, the circuit board 1800, the first driving part 1910 and the second driving part 1920 has the same structure as the first embodiment, and therefore detailed description thereof will be omitted.

Meanwhile, the first guide member 500 in the first embodiment was a rolling member.

Alternatively, the first guide member 1500 of the second embodiment may be a pressing member. For example, the first guide member 1500 of the second embodiment may be an elastic member that elastically supports the first moving part 1300 with respect to the fixed part 1200.

To this end, the first guide member 1500 of the second embodiment may include a first elastic member 1510 and a second elastic member 1520.

The first elastic member 1510 may be disposed at an upper end of the first frame 1200 constituting the fixed part 1200 and an upper end of the second frame 1300 constituting the first moving part 1300.

Additionally, the second elastic member 1520 may be disposed at a lower end of the first frame 1200 and a lower end of the second frame 1300.

The first elastic member 1510 and the second elastic member 1520 may elastically support the second frame 1300 at a position spaced apart from the first frame 1200 in the inner space of the first frame 1200.

FIG. 4 is a view showing a camera module according to a third embodiment.

Referring to FIG. 4, the camera module according to the third embodiment has the same basic structure as the camera module according to the first embodiment of FIG. 2, and the second guide member may be omitted.

For example, the camera module 2000 according to the third embodiment includes a lens part 2100. And, the lens part 2100 includes a lens barrel 2110 and a lens holder 2120. Meanwhile, an adhesive member 2130 may be applied between the lens holder 2120 and the first frame 2200 of the fixed part.

Meanwhile, the camera module of the third embodiment can include a fixed part 2200, a first moving part 2300, a second moving part 2400, a first guide member 2500, an elastic substrate 2700, a circuit board 2800, a first driving part 2910 and a second driving part 2920.

Here, the fixed part 2200, the first moving part 2300, the second moving part 2400, the first guide member 2500, the elastic substrate 2700, the circuit board 2800, the first driving part 2910 and the second driving part 2920 have the same structure as the first embodiment, and therefore detailed description thereof will be omitted.

Meanwhile, in the third embodiment, the second guide member 600 included in the first embodiment may be omitted.

For example, the second moving part 2400 of the third embodiment may be disposed in the inner space of the second frame 2300 while being supported only by the elastic substrate 2700. For example, the second moving part 2400 of the third embodiment may be floating and disposed in the inner space of the second frame 2300. Additionally, the elastic substrate may elastically support the second moving part 2400 so that the second moving part 2400 floats in the inner space of the second frame 2300.

Meanwhile, the camera module of the third embodiment may include a heat dissipation plate 2600. The heat dissipation plate 2600 may be disposed on an upper surface of a bottom portion of the second frame 2300. The heat dissipation plate 2600 may be disposed at a certain distance from the second moving part 2400. However, the embodiment is not limited to this. For example, the heat dissipation plate 2600 may contact the second moving part 2400. In the case of this structure, a lubricating member (not shown) may be disposed on a contact surface between the heat dissipation plate 2600 and the second moving part 2400, so that the second moving part 2400 can be easily moved in the first axis direction and in the second axis direction.

Meanwhile, in the camera module of the third embodiment, the first guide member 2500 is shown as being composed of the rolling member of the first embodiment, but is not limited thereto. For example, in the camera module of the third embodiment, the first guide member 1500 may be composed of a first elastic member and a second elastic member that are the pressing members of the second embodiment.

FIG. 5 is a view showing a camera module according to a fourth embodiment.

Referring to FIG. 5, the camera module according to the fourth embodiment has the same basic structure as the camera module according to the first embodiment of FIG. 2, and the second guide member may be omitted.

For example, the camera module 3000 according to the fourth embodiment includes a lens part 3100. And, the lens part 3100 includes a lens barrel 3110 and a lens holder 3120. Meanwhile, an adhesive member 3130 may be applied between the lens holder 3120 and the first frame 3200 of the fixed part.

Meanwhile, the camera module of the fourth embodiment can include a fixed part 3200, a first moving part 3300, a second moving part 3400, a first guide member 3500, an elastic substrate 3700, a circuit board 3800, a first driving part 3910 and a second driving part 3920.

Here, the fixed part 3200, the first moving part 3300, the second moving part 3400, the first guide member 3500, the elastic substrate 3700, the circuit board 3800, the first driving part 3910 and the second driving part 3920 have the same structure as the second embodiment, and therefore detailed description thereof will be omitted.

Meanwhile, in the fourth embodiment, the second guide member 1600 included in the second embodiment may be omitted.

For example, the second moving part 3400 of the fourth embodiment may be disposed in the inner space of the second frame 3300 while being supported only by the elastic substrate 3700. For example, the second moving part 3400 of the fourth embodiment may be arranged to float in the inner space of the second frame 3300. Additionally, the elastic substrate may elastically support the second moving part 3400 so that the second moving part 3400 floats in the inner space of the second frame 3300.

Meanwhile, the second moving part 3400 of the camera module of the third embodiment may include a heat dissipation plate 3440. The heat dissipation plate 3440 may be attached to a lower surface of the sensor substrate 3410 of the second moving part 3400. The heat dissipation plate 3440 is attached to a lower surface of the sensor substrate 3410, and thus can emit heat transmitted through the sensor substrate. Through this, the embodiment can increase the heat dissipation of the image sensor 3420 mounted on the sensor substrate.

Meanwhile, in the camera module of the fourth embodiment, the first guide member 3500 is shown as being composed of a first elastic member 3510 and a second elastic member 3520, which are the pressing members of the second embodiment, but is limited thereto. That is not the case. For example, in the camera module of the fourth embodiment, the first guide member 3500 may be configured as the rolling member of the first embodiment.

FIG. 6 is a view showing a camera module according to a fifth embodiment.

Referring to FIG. 6, the camera module according to the fifth embodiment has the same basic structure as the camera module according to the second embodiment of FIG. 3, and may further include an additional heat dissipation plate 4620.

For example, the camera module 4000 according to the fifth embodiment includes a lens part 4100. And, the lens part 4100 includes a lens barrel 4110 and a lens holder 4120. Meanwhile, an adhesive member 4130 may be applied between the lens holder 4120 and the first frame 4200 of the fixed part.

Meanwhile, the camera module of the fifth embodiment includes a fixed part 4200, a first moving part 4300, a second moving part 4400, a first guide member 4500, a second guide member 4620, and an elastic substrate 4700, a circuit board 4800, a first driving part 4910, and a second driving part 4920.

Here, the fixed part 4200, the first moving part 4300, the second moving part 4400, the first guide member 4500, the elastic substrate 4700, the circuit board 4800, the first driving part 4910 and the second driving part 4920 have the same structure as the second embodiment, and therefore detailed description thereof will be omitted.

Meanwhile, in the fifth embodiment, a second guide member 4620 is disposed between the second moving part 4400 and the second frame 4300. At this time, a heat dissipation plate 4610 is disposed on the second frame 4300. For example, the second frame 4300 may include a heat dissipation plate 4610. The heat dissipation plate 4610 is disposed on a bottom portion of the second frame 4300. Additionally, a groove (not shown) in which the second guide member 4620 is disposed may be formed in the heat dissipation plate 4610.

Meanwhile, the second guide member 4620 may contact the sensor substrate 4410. At this time, a ground pattern (not shown) may be disposed in an region of the sensor substrate 4410 that contacts the second guide member 4620. Additionally, the ground pattern of the sensor substrate 4410 may be connected to the heat dissipation plate 4610 through the second guide member 4620. Through this, the embodiment can transfer heat generated from the sensor substrate 4410 to the heat dissipation plate 4610 through the ground pattern and the second guide member 4620, and accordingly, the heat dissipation characteristics of the sensor substrate 4410 can be further improved.

Meanwhile, in the camera module of the fifth embodiment, the first guide member 4500 is shown as including the first elastic member 4510 and the second elastic member 4520 of the second embodiment, but is not limited thereto. For example, in the camera module of the fifth embodiment, the first guide member 4500 may include a plurality of balls that are the rolling members of the first embodiment.

FIG. 7 is a view showing a camera module according to a sixth embodiment.

Referring to FIG. 7, the camera module according to the sixth embodiment has the same basic structure as the camera module according to the second embodiment of FIG. 3, and may further include an additional heat dissipation plate 5620.

For example, the camera module 5000 according to the sixth embodiment includes a lens part 5100. And, the lens part 5100 includes a lens barrel 5110 and a lens holder 5120.

Meanwhile, an adhesive member 5130 may be applied between the lens holder 5120 and the first frame 5200 of the fixed part.

Meanwhile, the camera module of the sixth embodiment includes a fixed part 5200, a first moving part 530, a second moving part (5400, a first guide member 5500, a second guide member 5610, and an elastic substrate 5700), a circuit board 5800, a first driving part 5910, and a second driving part 5920.

Here, the fixed part 5200, the first moving part 300), the second moving part 5400, the first guide member 5500, the second guide member 5610, the elastic substrate 5700, the circuit board 5800, the first driving part 5910, and the second driving part 5920 are the same as the structure of the second embodiment, and therefore detailed description thereof will be omitted.

Meanwhile, in the sixth embodiment, a second moving part 5400 and a second guide member 5610 are disposed. At this time, a heat dissipation plate 5620 is disposed at a lower surface of the second moving part 5400. For example, the second moving part 5400 may include a heat dissipation plate 5620. The heat dissipation plate 5620 may be attached to the lower surface of the sensor substrate 5410 of the second moving part 5400. Additionally, the heat dissipation plate 520 may be connected to the ground pattern included in the sensor substrate 5410. Through this, the embodiment can transfer the heat generated in the sensor substrate 5410 to the outside through the heat dissipation plate 5620 and the second guide member 5610, and thereby improve heat dissipation characteristics.

Meanwhile, in the camera module of the sixth embodiment, the first guide member 5500 is shown as including the first elastic member 5510 and the second elastic member 5520 of the second embodiment, but is not limited thereto. For example, in the camera module of the sixth embodiment, the first guide member 5500 may include a plurality of balls that are the rolling members of the first embodiment.

FIG. 8 is a view showing a camera module according to a seventh embodiment.

Referring to FIG. 8, the camera module according to the seventh embodiment has the same basic structure as the camera module according to the sixth embodiment of FIG. 7, and may have different configurations of a first guide member 6500, a position detection part, a circuit board, and a first driving part.

In the camera module according to FIGS. 2 to 7, the first driving part of the actuator of the sensor driving device is implemented as a voice coil motor.

However, in the actuators of the first to sixth embodiments, a problem may occur in which the optical axis of the first moving part is distorted due to a circuit board including an image sensor and coil wiring. In addition, in order to move the first moving part in the third axis direction corresponding to the optical axis, the second moving part must also be moved together with the first moving part, and therefore, when implemented with the voice coil motor, sufficient driving force may not be generated. Furthermore, recently, in order to realize high resolution, the stroke for autofocus is increasing, which requires a long stroke of 1 mm or more.

Accordingly, the first driving part of the seventh embodiment is implemented as a piezoelectric ultrasonic motor rather than a voice coil motor.

Since the basic structure of the camera module of the seventh embodiment has already been described, detailed description thereof will be omitted.

The camera module of the seventh embodiment includes a lens part 6100. And, the lens part 6100 includes a lens barrel 6110 and a lens holder 6120. Meanwhile, an adhesive member 6130 may be applied between the lens holder 6120 and the first frame 6200 of the fixed part.

Meanwhile, the camera module of the seventh embodiment includes a fixed part 6200, a first moving part 6300, a second moving part 400), a first guide member 6500, a second guide member 6610, and an elastic substrate 6700, a circuit board 6800, a first driving part 6910, and a second driving part 6920.

Here, a basic structure of the fixed part 6200, the first moving part 6300, the second moving part 6400, the second guide member 6610, the elastic substrate 6700, the circuit board 6800, and the second driving part is the same as that of the sixth embodiment, and therefore detailed description thereof will be omitted.

Meanwhile, the camera module of the seventh embodiment includes a first guide member 6500.

The first guide member 6500 may include a guide pin different from that of the previous embodiment.

For example, the first guide member 6500 includes a guide pin. For example, the first guide member 6500 includes a plurality of guide pins disposed at a plurality of different positions.

The first guide member 6500 may be fixed to the fixed part 6200. For example, one end of the first guide member 6500 may be coupled to the lens holder 6120 of the lens part, and other end opposite to the one end may be fixed to the first frame 6200.

The guide pins constituting the first guide member 6500 may be arranged to extend between the lens holder 6120 and the first frame 6200 in a third axis direction corresponding to the optical axis.

Meanwhile, a through hole (not shown) through which the guide pin of the first guide member 6500 penetrates may be formed in the second frame 6300 constituting the first moving part 6300.

Accordingly, one end and the other end of the guide pin of the first guide member 6500 may be fixed to the lens holder 6120 and the first frame 6200 in a state where it is inserted into the through hole of the second frame 6300. Accordingly, the second frame 6300 of the first moving part 6300 of the embodiment may be guided to move in the optical axis direction along the guide pin of the first guide member 6500 inserted into the through hole. Accordingly, the embodiment can solve the reliability problem of the optical axis being distorted through the guide pin penetrating the second frame 6300, and thus can implement a more stable and accurate autofocus function.

Meanwhile, the first driving part 6910 of the seventh embodiment can move the first moving part 6300 in the optical axis direction with respect to the fixed part 6200 using a piezoelectric element method.

To this end, the first driving part 6910 may include a piezoelectric element 6911 and an extension bar 6912.

The extension bar 6912 may be arranged to extend in the optical axis direction between an inside of the first frame 6200 and an outside of the second frame 6300.

The piezoelectric element 6911 may include a piezoelectric device. For example, the piezoelectric element 6911 may include a material that causes mechanical deformation by applied power. The piezoelectric element 6911 can contract or expand by the applied power to cause mechanical deformation in a set direction. For example, the piezoelectric element 6911 may cause mechanical deformation in the optical axis direction, which is the direction in which the extension bar 6912 is disposed, and generate vibration due to the applied power.

Meanwhile, the first driving part 6910 may include a fixing plate 6913. The fixing plate 6913 may be coupled to the extension bar 6912. The fixing plate 6913 is coupled to the extension bar 6912, and accordingly, at least a portion of the fixing plate may be in contact with the outer surface of the second frame 6300. The fixing plate 6913 may support the second frame 6300. Additionally, the fixing plate 6913 may move in a direction of extension of the extension bar 6912 due to vibration caused by mechanical deformation of the piezoelectric element 6911. And, the second frame 6300 in contact with the fixing plate 6913 can move together with the movement of the fixing plate 6913.

The first driving part 6910 may include a buffer member.

The buffer member penetrates the lens holder 6120 and may include a first buffer member 6914 having a hole through which one end of the extension bar 6912 passes. Additionally, the buffering member penetrates the first frame 6200 and may include a second buffering member 6915 having a hole through which the other end of the extension bar 6912 passes.

Specifically, the first buffering member 6914 may be disposed in an upper region of the extension bar 6912, and the second buffering member 6915 may be disposed in a lower region of the extension bar 6912. When operating the first driving part 6910, the first buffering member 6914 and the second buffering member 6915 can prevent vibration transmitted from the extension bar 6912 from being transmitted to the lens holder 6120 and the first frame 6200. Additionally, the first buffering member 6914 and the second buffering member 6915 can prevent the extension bar 6912 from being deformed or damaged.

Meanwhile, the seventh embodiment may include a position detection part.

Specifically, in the first to sixth embodiments, the first driving part includes a voice coil motor, and accordingly, a relative position of the second frame with respect to the first frame was detected using the change in magnetic force between the hall sensor and the magnet part.

In contrast, the seventh embodiment uses a piezoelectric element method to move the second frame relative to the first frame. Accordingly, the embodiment includes a position detection part for detecting the relative position of the second frame 6300 with respect to the first frame 6200.

The position detection part may include a sensing magnet 6930 and a Hall sensor 6940.

The Hall sensor 6940 may be disposed on the inner surface of the first frame 6200. To this end, the circuit board 6800 can include a sixth substrate region 6860 extending downward from the fourth substrate region 6840 to fix the Hall sensor 6940 inside the first frame 6200.

Additionally, the sensing magnet 6930 may be disposed on the outer surface of the second frame 6300. The sensing magnet 6930 may be disposed facing the Hall sensor 6940. And, when the second frame 6300 moves with respect to the first frame 6200, the sensing magnet 6930 also moves correspondingly. Accordingly, the magnetic force intensity information detected through the Hall sensor 6940 changes, and accordingly, the relative position of the second frame 6300 with respect to the first frame 6200 can be detected.

Meanwhile, the circuit board 6800 may further include a seventh substrate region 6870 extending from the first substrate region 6810 and connected to the piezoelectric element 6911 of the first driving part 6910.

According to the embodiment, OIS and AF of the camera module are implemented by moving the image sensor relative to the lens barrel, instead of moving the lens barrel in a comparative example. For example, the lens barrel of the embodiment maintains a fixed position. In addition, the image sensor of the embodiment may move in the x-axis direction, move in the y-axis direction, move in the z-axis direction, and rotate around the z-axis with respect to the lens barrel. Accordingly, the embodiment can implement stable AF operation and OIS operation with a small driving force by moving the image sensor instead of moving a relatively heavy lens barrel.

In addition, the embodiment arranges a heat dissipation plate and a second guide member on the second moving part including the image sensor. Accordingly, the embodiment can easily dissipate heat generated from the image sensor through the heat dissipation plate and the second guide member. Accordingly, the embodiment can improve the heat dissipation characteristics of the image sensor and thereby improve the operational reliability of the camera module.

In addition, the embodiment applies a piezoelectric element as a driving part to move the image sensor in a z-axis direction with respect to the lens barrel. Accordingly, the embodiment can move the image sensor using a piezoelectric element that can provide greater driving force than a voice coil motor, and accordingly, it enables more stable operation and thus increases a stroke corresponding to the moving range of the image sensor.

FIG. 9 shows a mobile terminal to which a camera module according to an embodiment is applied.

As shown in FIG. 9, the mobile terminal 7000 of the embodiment may include a camera module 7100, a flash module 7400, and an autofocus device 7300 provided at a rear. The mobile terminal 7000 of the embodiment may further include a second camera module 7200.

The camera module 7100 may include an image capture function and an autofocus function. For example, the camera module 7100 may include an autofocus function using images. For example, the camera module 7100 may include any one of the camera modules shown in FIGS. 2 to 8.

The camera module 7100 processes image frames of still or moving images obtained by an image sensor in shooting mode or video call mode. The processed image frame can be displayed on a certain display unit and stored in memory. A camera (not shown) may also be disposed at a front of the mobile terminal body.

For example, the camera module 7100 may include a first camera module and a second camera module, and the first camera module may enable OIS implementation along with AF or zoom functions.

The flash module 7400 may include a light-emitting element therein that emits light. The flash module 7400 can be operated by operating a camera of a mobile terminal or by user control.

The autofocus device 7300 may include one of packages of surface light-emitting laser devices as a light emitting unit.

The autofocus device 7300 may include an autofocus function using a laser. The autofocus device 7300 can be mainly used in conditions where the autofocus function using the image of the camera module 7100 is degraded, for example, in close proximity of 10 m or less or in dark environments. The autofocus device 7300 may include a light emitting unit including a vertical cavity surface emitting laser (VCSEL) semiconductor element, and a light receiving unit that converts light energy into electrical energy, such as a photo diode.

According to the embodiment, OIS and AF of the camera module are implemented by moving the image sensor relative to the lens barrel, instead of moving the lens barrel in a comparative example. For example, the lens barrel of the embodiment maintains a fixed position. In addition, the image sensor of the embodiment may move in the x-axis direction, move in the y-axis direction, move in the z-axis direction, and rotate around the z-axis with respect to the lens barrel. Accordingly, the embodiment can implement stable AF operation and OIS operation with a small driving force by moving the image sensor instead of moving a relatively heavy lens barrel.

In addition, the embodiment arranges a heat dissipation plate and a second guide member on the second moving part including the image sensor. Accordingly, the embodiment can easily dissipate heat generated from the image sensor through the heat dissipation plate and the second guide member. Accordingly, the embodiment can improve the heat dissipation characteristics of the image sensor and thereby improve the operational reliability of the camera module.

In addition, the embodiment applies a piezoelectric element as a driving part to move the image sensor in a z-axis direction with respect to the lens barrel. Accordingly, the embodiment can move the image sensor using a piezoelectric element that can provide greater driving force than a voice coil motor, and accordingly, it enables more stable operation and thus increases a stroke corresponding to the moving range of the image sensor.

Next, FIG. 10 is a perspective view of a vehicle to which a camera module according to an embodiment is applied.

For example, FIG. 10 is an external view of a vehicle equipped with a vehicle driving assistance device to which a camera module is applied according to an embodiment.

Referring to FIG. 10, the vehicle 8000 of the embodiment may be provided with wheels 8200FL and 8200FR that rotate by a power source and a predetermined sensor. The sensor may be a camera sensor 8100, but is not limited thereto.

The camera 8100 may be a camera sensor to which the camera module shown in any one of FIGS. 2 to 8 is applied.

The vehicle 8000 according to the embodiment may acquire image information through the camera sensor 8100 that photographs a front image or a surrounding image, and may determine an unidentified situation of a lane by using the image information and generate a virtual lane in the unidentified situation.

For example, the camera sensor 8100 may acquire the front image by photographing a front of the vehicle 8000, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 51, the processor detects such an object to include in the image information.

In this case, the processor may acquire distance information with the object detected through the camera sensor 8100 to further complement the image information. The image information may be information about an object captured in the image.

Such a camera sensor 8100 may include an image sensor and an image processing module. The camera sensor 8100 may process a still image or moving image obtained by the image sensor (e.g., CMOS or CCD). The image processing module may process the still image or moving image acquired through the image sensor to extract necessary information, and may transmit the extracted information to the processor.

In this case, the camera sensor 8100 may include a stereo camera so as to improve the measurement accuracy of the object and to secure more information such as a distance between the vehicle 8000 and the object, but the embodiment is not limited thereto.

The vehicle 8000 of the embodiment may provide advanced driver assistance systems (ADAS).

For example, the advanced driver assistance systems (ADAS) includes an automatic emergency braking (AEB) system that automatically slows down or stops in the event of a collision without the driver having to apply the brakes, a lane keep assist system (LKAS), which adjusts the driving direction when leaving the lane to maintain the lane, an advanced smart cruise control (ASCC), which automatically maintains a distance from the car in front while traveling at a preset speed, an active blind spot detection (ABSD) that detects the risk of blind spot collisions and helps change lanes safely, and an around view monitor (AVM) system that visually shows the situation around the vehicle.

In these advanced driver assistance systems (ADAS), camera modules function as core components along with radar, and the proportion of camera modules being applied is gradually expanding.

For example, in the case of automatic emergency braking (AEB), vehicle's front camera sensor and radar sensor can detect vehicles or pedestrians ahead and automatically apply emergency braking when the driver does not control the vehicle. In addition, in the case of driving steering assistance system (LKAS), the camera sensor detects whether the driver deviates from the lane without using turn signals and automatically steers the steering wheel to maintain the lane. Additionally, the Around View Monitoring System (AVM) can visually show the situation around the vehicle through camera sensors placed on all sides of the vehicle.

The characteristics, structures and effects described in the embodiments above are included in at least one embodiment but are not limited to one embodiment. Furthermore, the characteristics, structures, and effects and the like illustrated in each of the embodiments may be combined or modified even with respect to other embodiments by those of ordinary skill in the art to which the embodiments pertain. Thus, it should be construed that contents related to such a combination and such a modification are included in the scope of the embodiment.

The above description has been focused on the embodiment, but it is merely illustrative and does not limit the embodiment. A person skilled in the art to which the embodiment pertains may appreciate that various modifications and applications not illustrated above are possible without departing from the essential features of the embodiment. For example, each component particularly represented in the embodiment may be modified and implemented. In addition, it should be construed that differences related to such changes and applications are included in the scope of the embodiment defined in the appended claims.

The invention claimed is:

1. A sensor driving device comprising:
a fixed part;
a lens part disposed on the fixed part;
a first moving part disposed in an inner space of the fixed part and spaced apart from the fixed part;
a second moving part disposed in an inner space of the first moving part and spaced apart from the first moving part, and including an image sensor;

a first driving part that moves the first moving part relative to the fixed part; and a second driving part that moves the second moving part relative to the first moving part, wherein the first driving part moves the first and second moving parts in an optical axis direction of the lens part with respect to the fixed part and the lens part in the inner space of the fixed part, and wherein the second driving part moves the second moving part in a first direction perpendicular to the optical axis direction and a second direction perpendicular to the optical axis direction and the first direction with respect to the fixed part, the lens part and the first moving part in the inner space of the first moving part.

2. The sensor driving device of claim 1, wherein the first driving part is provided to move the first moving part based on a first driving force corresponding to a first driving method, and wherein the second driving part is provided to move the second moving part based on a second driving force of a second driving method different from the first driving method.

3. The sensor driving device of claim 2, wherein the first driving part of the first driving method includes a piezo-electric ultrasonic motor, and wherein the second driving part of the second driving method includes a voice coil motor.

4. The sensor driving device of claim 1, wherein the lens part includes:

a lens barrel; and a lens holder coupled to the lens barrel and fixed to the fixed part.

5. The sensor driving device of claim 4, wherein the fixed part includes a first frame, wherein the first moving part includes a second frame disposed inside the first frame, wherein a first guide member is disposed between the first frame and the lens holder, and wherein the first guide member includes a guide pin that has one end coupled to the lens holder, an other end coupled to the first frame, and penetrating the second frame in the optical axis direction.

6. The sensor driving device of claim 5, wherein the first driving part includes:

an extension bar disposed between the first frame and the second frame;

a piezoelectric element coupled to the extension bar; and a fixing plate coupled between the extension bar and the second frame, wherein the second frame is provided to be movable in a third axis direction corresponding to the optical axis by a driving force provided through the first driving part.

7. The sensor driving device of claim 6, wherein the first driving part includes:

a first buffering member disposed between the extension bar and the lens holder; and a second buffering member disposed between the extension bar and the first frame.

8. The sensor driving device of claim 6, wherein when the second frame of the first moving part moves in the third axis direction by the first driving part, the second moving part moves along with the second frame in the third axis direction.

9. The sensor driving device of claim 5, wherein the second moving part includes:

a sensor substrate on which the image sensor is disposed;

a sensor base disposed on the sensor substrate; and a filter disposed on the sensor base.

10. The sensor driving device of claim 9, further comprising an elastic substrate disposed between the sensor substrate and the second frame, wherein the elastic substrate includes a conductive pattern part that is electrically connected to the sensor substrate and elastically supports the sensor substrate with respect to the second frame.

11. The sensor driving device of claim 6, wherein the second driving part includes:

a magnet part disposed on the sensor base; and a coil part disposed on the second frame and corresponding to the magnet part, and wherein the second driving part is provided to move the second moving part relative to the second frame in a direction of a first axis perpendicular to the third axis direction and in a direction of a second axis perpendicular to the third axis direction and the first axis.

12. The sensor driving device of claim 9, further comprising a second guide member disposed between the second frame and the sensor substrate.

13. The sensor driving device of claim 12, wherein the second frame or the sensor substrate includes a heat dissipation plate, and wherein the second guide member contacts the heat dissipation plate.

14. The sensor driving device of claim 13, wherein the sensor substrate includes a ground pattern, and wherein at least one of the heat dissipation plate and the second guide member is connected to the ground pattern.

15. The sensor driving device of claim 5, further comprising a position detection part disposed between the first frame and the second frame and detecting a relative position of the second frame with respect to the first frame.

16. The sensor driving device of claim 15, wherein the position detection part includes a Hall sensor disposed in the first frame and a sensing magnet disposed in the second frame.

17. The sensor driving device of claim 4, wherein the first driving part implements AF by moving the first moving part and the second moving part, wherein the second driving part implements OIS by moving the second moving part, and wherein a position of the lens part is fixed when implementing the AF and OIS.

18. A camera module comprising:

a housing;

a lens part disposed within the housing; and a sensor driving device disposed within the housing, including an image sensor overlapping the lens part in an optical axis direction, and moving relative to the lens part, wherein the sensor driving device includes:

a fixed part connected to the lens part;

a first moving part disposed in an inner space of the fixed part and spaced apart from the fixed part;

a second moving part disposed in an inner space of the first moving part and spaced apart from the first moving part, and including the image sensor;

a first driving part that moves the first moving part relative to the fixed part; and a second driving part that moves the second moving part relative to the first moving part, wherein the first driving part moves the first and second moving parts in an optical direction of the lens part with respect to the fixed part and the lens part in the inner space of the fixed part, wherein the second driving part moves the second moving part in a first direction perpendicular to the optical axis direction and a second direction perpendicular to the optical axis direction and the first direction with respect to the fixed part, the lens part and the first moving part in the inner space of the first moving part, and wherein a position of the lens part is fixed when the first and second moving parts move by the first and second driving parts.

19. The camera module of claim 18, wherein the first driving part includes a piezoelectric ultrasonic motor, and wherein the second driving part includes a voice coil motor.

* * * * *